United States Patent [19]

Ford

[11] Patent Number: 5,310,599
[45] Date of Patent: May 10, 1994

[54] METHOD FOR MAKING POLYMERS OF ALPHA-HYDROXY ACIDS

[75] Inventor: Thomas M. Ford, Greenville, Del.

[73] Assignee: E. I. Du Pont de Nemours and Company, Wilmington, Del.

[21] Appl. No.: 57,817

[22] Filed: May 6, 1993

[51] Int. Cl.$^5$ ............... C08G 63/84; C08G 63/91
[52] U.S. Cl. ................ 528/354; 525/415; 528/357
[58] Field of Search ............ 528/354, 357; 525/415

[56] References Cited

U.S. PATENT DOCUMENTS

| | | | |
|---|---|---|---|
| 4,033,938 | 7/1977 | Augurt et al. | 528/357 |
| 4,622,244 | 11/1986 | Lapka et al. | 427/213.32 |
| 4,644,038 | 2/1987 | Protzman | 525/412 |
| 5,028,667 | 7/1991 | McLain et al. | 525/415 |
| 5,208,297 | 5/1993 | Ford et al. | 525/415 |
| 5,210,108 | 5/1993 | Spinu et al. | 521/182 |
| 5,235,031 | 8/1993 | Drysdale et al. | 528/354 |

OTHER PUBLICATIONS

Dahlmann et al., Synthesis and Properties of Biodegradable Aliphatic Polyesters, *British Polymer Journal*, 23, pp. 235-240, (1990).

Leenslag et al., Synthesis of high-molecular-weight poly(L-lactide) initiated with tin 2-ethylhexanoate, *Makromol. Chem.*, 188, pp. 1809-1814, (1987).

Jamshidi and Eberhart, Characterization of Polylactide Synthesis, *Polymer Preprints*, 28 (1), pp. 236-237, (1987).

Primary Examiner—John Kight, III
Assistant Examiner—Shelley A. Dodson

[57] ABSTRACT

A method providing a catalyzed ring opening polyester polymerization at a high reaction rate wherein the amount of organic acid in the reaction medium is maintained at an acid: catalyst ratio below 6:1.

8 Claims, 1 Drawing Sheet

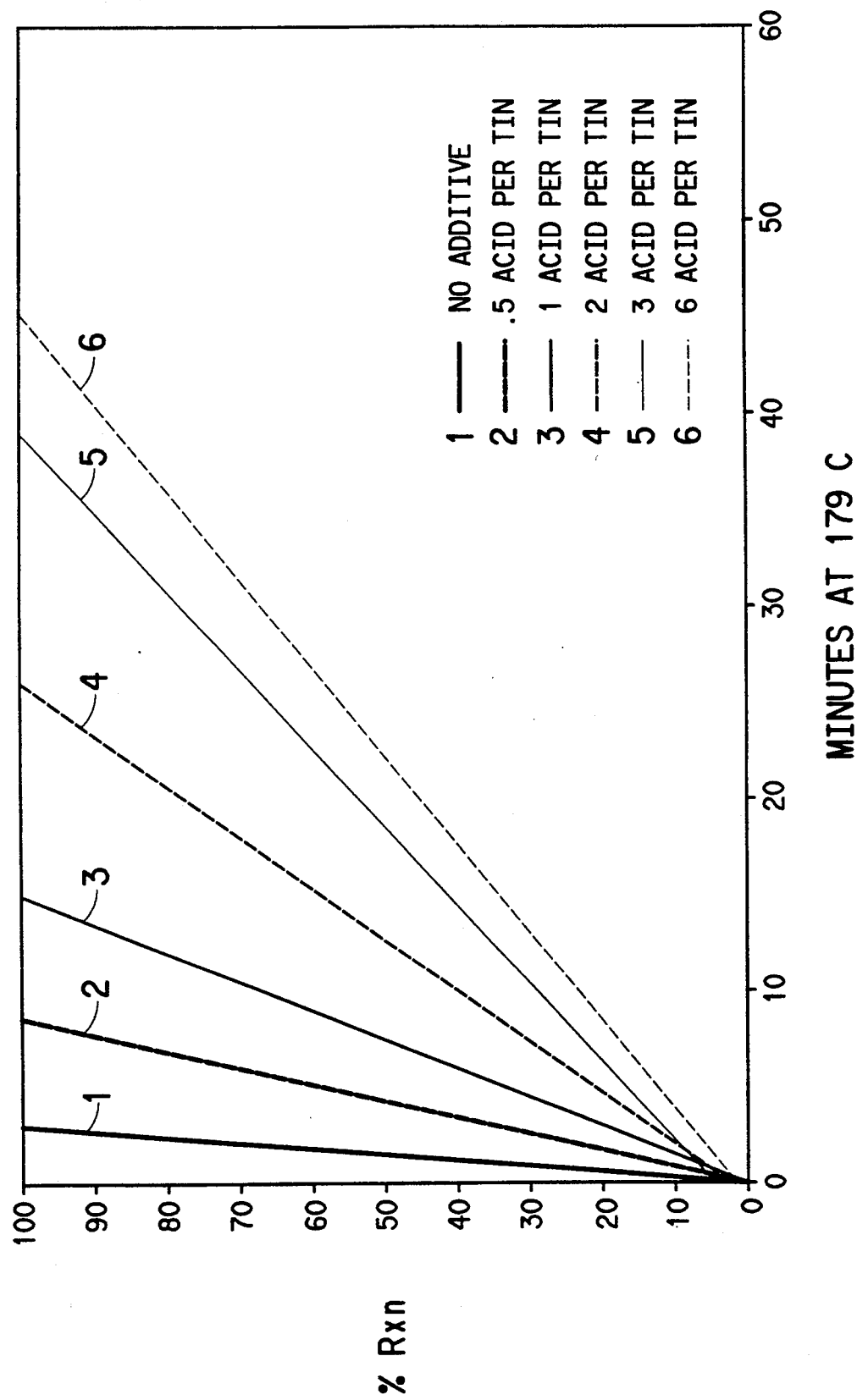

METHOD FOR MAKING POLYMERS OF ALPHA-HYDROXY ACIDS

FIELD OF THE INVENTION

The present invention is directed to a method for making polymers of alpha-hydroxy acids. In particular, it is directed to a method for making such polymers by catalyzed ring opening of the cyclic esters of certain alpha-hydroxy acids.

BACKGROUND OF THE INVENTION

Because of the increasing problem of disposing of industrial and domestic wastes, there is currently substantial interest in the use of biodegradable polymers in many applications. Among the more serious of these problems is the disposal of various plastic wastes, containing polymers such as polyethylene, polypropylene, polystyrene, polyurethanes and the like. These by and large are not biodegradable, particularly after being covered, such as in a landfill. Though polymers of lactic acid and glycolic acid and several other aliphatic polyesters are known to be hydro/biodegradable (i.e., they are readily degradable through the action of water and/or microorganisms.), their widespread use has been hindered by their high cost of production. The manufacture of alpha hydroxy acid polymers and copolymers has been costly in large part because of the difficult process by which they have been made heretofore.

The polymerization of lactide (3,6-dimethyl-1,4-dioxane-2,5-dione) and glycolide (1,4-dioxane-2,5-dione) which are composed of two units of lactic or glycolic acid in the form of a ring, respectively is, of course, well known. In this polymerization process, the ring monomers and any comonomers present are heated together in the presence of a ring opening catalyst such as stannous octoate, or a compound of yttrium or a lanthanum series rare earth catalyst or a titanate. However, extremely low polymerization rates and the resultant long reaction times have made continuous process for making these polymers substantially impractical from an industrial point of view. On the other hand, the use of batch reactions for this purpose results in polymers having excessively high melt viscosity and low melt stability. These, in turn, lead to polymer discoloration and low yields. Such problems have contributed to making these potentially important polymers too expensive for widespread use in consumer applications. Problems have contributed to making these potentially important polymers too expensive for widespread use in consumer applications.

PRIOR ART

It has been discussed in the literature that the rate of polymerization of, for example, lactides is dependent on reaction temperature and the amount of catalyst. See *Makromol, Chem.*, Vol. 188, page 1809–1814 (1987), which also states that small amounts of water can enhance the polymerization rate of lactide.

Many techniques have been employed to carry out such polymerizations on both a batch and continuous basis. German application DE 3936188A1, for example, describes the use of a screw extruder for polymerization of lactide, glycolide and mixtures thereof.

U.S. Pat. No. 4,033,938 to Augurt et al. is directed to the polymerization and copolymerization of substituted 1,4-dioxane-2,5diones to produce polymers which readily absorbed in mammalian tissue. Copolymers of such diones with glycolide and lactide are disclosed using a stannous chloride catalyst. Copolymerizations with lactides are shown to require a minimum time of 2 hours at 180 C.

U.S. Pat. No. 4,622,244, Lapka et al. is directed to the use of poly (lactic acid) and poly (glycolic acid) polymers, which are bioabsorbable, in the preparation of microcapsules for the controlled release of encapsulated drug materials. Polymerization conditions are not given.

U.S. Pat. No. 4,644,038, Protzman, is directed to copolymers of poly (alpha-hydroxy acid) and ethylenically unsaturated epoxides which are prepared by copolymerization of C2-5 alpha hydroxy acid diesters with ethylenically epoxides in the presence of both a ring opening catalyst and a free radical initiator. Various ring opening catalysts are disclosed such as stannous octoate, tin chloride, diethyl zinc and zinc chloride. The time to effect copolymerization was greater than one hour at 175 C.

BRIEF DESCRIPTION OF THE DRAWING

The drawing consists of a single FIGURE which is a graphical correlation of the effect of organic acid on the rate of lactide polymerization.

SUMMARY OF THE INVENTION

The invention is therefore directed to the problem of improving the rates of the polymerization of lactides and glycolides to such an extent that they can now be carried out economically in commercial scale quantities.

In particular, the invention is therefore directed to an improved method for preparing polymers of alpha-hydroxy acids by catalyzed ring opening of cyclic esters of the alpha-hydroxy acids comprising the sequential steps of (1) forming a liquid phase dispersion of the cyclic diester and ring opening catalyst in which the mole ratio of cyclic diester to catalyst is 500–20,000:1 and the mole ratio of organic acid impurity to catalyst is less than 6:1, and preferably less than 1:1; and (2) maintaining (a) the temperature of the dispersion at 50–250 C, (b) the mole ratio of cyclic diester to catalyst at 500–20,000:1 and (c) the mole ratio of organic acid to catalyst in the dispersion below 6:1 to effect polymerization of the monomers to a conversion of at least 95%, at high rate.

DETAILED DESCRIPTION OF THE INVENTION

The present invention is a method for increasing the rate of polymerization in a catalyzed ring opening polymerization for producing glycolide based polymers, lactide based polymers, copolymers thereof or copolymers of either with up to 20 weight percent of one of the herein below defined comonomers. An essential element of the present invention is that mol ratio of acid impurity to catalyst present in the reaction medium be maintained below 6:1; and preferably below 1:1. Because any water present can cause ring scission of the lactide or glycolide, it is considered as acid for purposes of the present invention. The polymerization reaction is carried out similarly to known methods at temperatures of from 50 to 250 C. and preferably from about 160 C. to about 220 C. and a pressure from ambient to about 2,000 psi ($1.379 \times 10^6$ Pa).

The lactide or glycolide can be polymerized separately, which generally is the preferred case, or together in any ratio or in conjunction with up to about 20 weight percent of another co-polymerizable monomer, such as epsilon-caprolactone, delta-valerolactone, 1,5-dioxepan-2-one, 1,4-dioxan-2-one, beta-butyrolactone and beta-propiolactone or mixtures thereof. Generally these lactone comonomers have the one of the structional formulas selected from the group consisting of

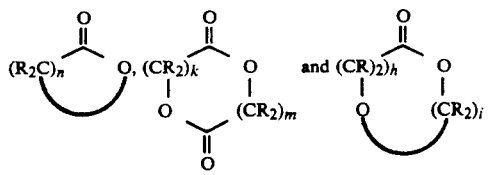

wherein n is 4 or 5, h, i, k and m are independently one or two and each R is independently chosen from H or hydrocarbyl containing up to 12 carbon atoms.

Polymerization methods include methods carried out in a melt, in solution, or in suspension.

Ordinarily, conventional tin catalysts are used for the polymerization reaction, and stannous octoate (stannous 2-ethylhexanoate). Other tin compounds having a catalytic effect on the polymerization reaction may also be used, such as tetraphenyltin, tin bis-acetylacetonate, and tin (II) chloride. Suitable catalysts also include yttrium and lanthanum rare earth series metals having atomic numbers 57 through 71, namely lanthanum, cerium, praseodymium, neodymium, promethium, samarium, europium, gadolinium, terbium, dysprosium, holmium, erbium, thulium, ytterbium and lutetium. Preferred metals are yttrium, lanthanum, erbium, samarium and dysprosium. Especially preferred are yttrium, lanthanum and mixtures of yttrium and rare earth metals that are obtained from the mining and smelting of rare earth metal ores. In all of the catalysts the yttrium and rare earth metal is trivalent. The catalyst should preferably be at least slightly soluble in the reaction medium.

A further discussion of these catalysts can be found in U.S. Pat. No. 5,028,667 issued Jul. 2, 1991, to Stephan J. McLain et al., and copending application Ser. No. 07/814,135 filed Dec. 30, 1991 by Thomas M. Ford et al. the disclosures of which are hereby incorporated by reference.

Additional ring opening catalysts suitable for use herein include titanates, zirconates, diethyl zinc, and antimony oxides and halides.

As used herein: the term "polymer" includes homopolymers as well as copolymers; the term "copolymers" includes bipolymers, tripolymers and higher multipolymers; and the term "monomer/catalyst ratio" includes all of the polymerizable and copolymerizable monomeric species present in the reaction system including cyclic esters and comonomers, if any.

The monomer to catalyst ratio is generally maintained below 20,000:1 by moles, and it is usually not less than 500:1. Good results have been observed when the monomer/catalyst ratio is within the range of 15,000 to 1,000 to 1 by moles, with the preferred ratio being in the range of from 10,000 to 4,000 to 1 by moles. Employing a monomer/catalyst ratio of 1000 to 1 and reducing and/or maintaining the acid/catalyst ratio below at least 6:1 and preferably below 1:1 (with other conditions ideal), full (i.e. about 95%) conversion can be achieved in as little as 2 minutes. When monomer to catalyst ratios less than 500:1 are used, product coloration, contamination and instability can result.

It has been recognized in the prior art that water and/or its reaction products with the monomers of interest (e.g. lactic acid and/or its linear oligomers) should be kept below certain levels in order to obtain polymers of sufficiently high molecular weight. *British Polymer Journal*, Vol. 23, No. 3, p. 235–240(1990), the teachings of which are incorporated herein by reference, discusses ring-opening polymerization of D,L-dilactide and states, at page 236: "A basic prerequisite to achieve a high degree of polymerization is the use of very pure monomers . . . the content of free carboxylic groups should not exceed . . . 0.8 m eq/g". (This is equivalent to the absolute limit of the present invention, 6/1 acid/catalyst ratio and 500/1 monomer to catalyst ratio. Much lower levels of acidic impurities must be maintained for the preferred modes of operation.)

In practicing the invention, the polymerization can be carried out in any standard equipment. Continuous polymerization can be effected in a screw extruder, or any other reactor with adequate mixing to give a highly homogeneous product. A stirred tank can be used for batch polymerization, and also for continuous feed of monomer and removal of polymer (or intermediate product). The polymerization can be carried out in the presence or absence of a solvent. A preferred technique is to operate in the bulk (i.e., without solvent) and to prepare an intermediate in a stirred tank, with final polymerization being carried out in a screw extruder. The catalyst can be added to the monomer before or in the initial reactor.

To contrast with the outstanding results obtained in the present invention as demonstrated in the Examples, the following Table 1 shows the reaction times required under conditions that have been conventionally used for the polymerization of lactide. For all entries Tin octoate (Stannous bis 2-ethylhexanoate) was the catalyst and lactide was the starting monomer.

TABLE 1

| Mon/Cat (mol ratio) | Polym. Time(h) | Polym. Temp (C.) | Percent Reaction | Reference |
|---|---|---|---|---|
| 10000:1 | 24 | 130 | 44 | (1) |
| 3333 | 25 | 130 | 96 | (1) |
| 20000 | 14 | 180 | 78 | (1) |
| 20000 | 24 | 150 | 64 | (1) |
| 10000 | 4 | 180 | 93 | (1) |
| 18842 | 1.4 | 200 | 96 | (2) |
| 18842 | 2.5 | 180 | 96 | (2) |
| 18842 | 1 | 160 | 71 | (2) |
| 10000 | 2 | 160 | 91 | (3) |
| 10000 | 0.35 | 180 | 57 | (3) |
| 10000 | 0.48 | 180 | 78 | (3) |

(1) DAHLMANN, J.; RAFLER, G; FECHNER, K; MEHLIS, B. British Polymer Journal, 1990, 23, 235–240.
(2) PENNINGS, A. J; LEENSLAG, J. Makromol Chem, 1987, 188, 1809–1814.
(3) JAMSHIDI, K.; EBERHART, R.C.; HYON S.H.; IKADA. Y; Polymer preprints 1987, 28 236–237
Mon/Cat = Monomer/Catalyst Ratio
Polym = Polymerization

EXAMPLE 1

Continuous Bulk Polymerization of Lactide

A 9:1 mixture of L- and D/L-lactide (with water and lactic acid undetectable by GC analysis) was fed as a solid to a twin screw extruder (with barrel diameter 30 mm) held at 180 C. at a rate of 15 pounds/hour. A 0.5 molar azeotropically dried toluene solution of stannous octoate was added to the monomer stream prior to melting at a rate to give a molar monomer to catalyst ratio of 6000/1. The residence time was estimated via color pellet injection to be ca. 5 min. The polymer strand exiting the extruder was quenched to room temperature and pelletized. TGA analysis of the resulting pellet indicated a conversion of 98%. The product was colorless, and had molecular weight (GPC vs. p-styrene standard) Mw=389000, Mn=148000. The product could be processed via methods known in the art into oriented films, injection molded parts of complex shape, monofilaments and microcellular foams.

EXAMPLE 2

Effect of Catalyst Level

A polymerization similar to that in Example 1 but with a monomer to catalyst molar ratio of 13000/1. The conversion was 85%.

EXAMPLE 3

Effect of Acid Impurities

A series of lab scale polymerizations were performed to determine the kinetics of L-lactide polymerization in the absence and presence of small amounts of added organic carboxylic acid. Conversion was determined via TGA analysis of rapidly quenched polymerizations, all run at 179 C. FIG. 1 shows the negative effect of added organic acid on the polymerization rate.

I claim:

1. A method for preparing polymers of alpha-hydroxy acids by catalyzed ring opening of cyclic diesters selected from the group consisting of lactide, glycolide and mixtures thereof and comprising up to 20 weight percent of a monomer selected from the group consisting of

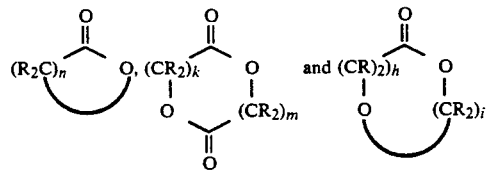

where n is 4 or 5, h, i, k and m are independently 1 or 2, each R is independently selected from hydrogen or hydrocarbyl containing up to 12 carbon atoms comprising the steps of:
  a. forming a liquid phase dispersion of the cyclic diesters, monomer and ring-opening catalyst selected from the group consisting of tin compounds, yttrium compounds, compounds of lanthanum series rare earth metals having atomic numbers 57–71, titanates, zirconates, zinc compounds, antimony compounds and mixtures thereof, wherein the mole ratio of monomer to catalyst is 500–20,000:1 and the mole ratio of organic acid to catalyst is less than 6:1; and
  b. maintaining (1) the temperature of the dispersion at 50–250 C., (2) the mole ratio of cyclic ester to catalyst at 500–20,000:1 and (3) the mole ratio of organic acid to catalyst in the dispersion below 6:1 to effect polymerization of the monomers to a conversion of at least 95% at a high rate.

2. The method of claim 1 in which the cyclic ester is selected from lactide, glycolide and mixtures thereof.

3. The method of claim 2 wherein the temperature is maintained at from about 160 C. to 220 C.

4. The method of claim 3 in which the method is carried out in an extruder.

5. The method of claim 4 in which the mole ratio of acid to catalyst is below 2:1.

6. The method of claim 5 in which the mole ratio of cyclic ester to catalyst is 1,500–10,000:1.

7. The method of claim 1 in which the dispersion contains a mixture of cyclic diester and a polymerizable comonomer to produce a random copolymer of the cyclic ester.

8. The method of claim 7 in which the comonomer is selected from the group consisting of epsilon caprolactone, delta valerolactone, 1,5-dioxepan-2-one, 1,4-dioxan-2-one, beta butyrolactone, beta propiolactone, 6-methyl-2,5-morpholinedione and mixtures thereof.

* * * * *